June 11, 1935. A. TAUB 2,004,254
CRANKSHAFT BEARING
Filed Aug. 12, 1933
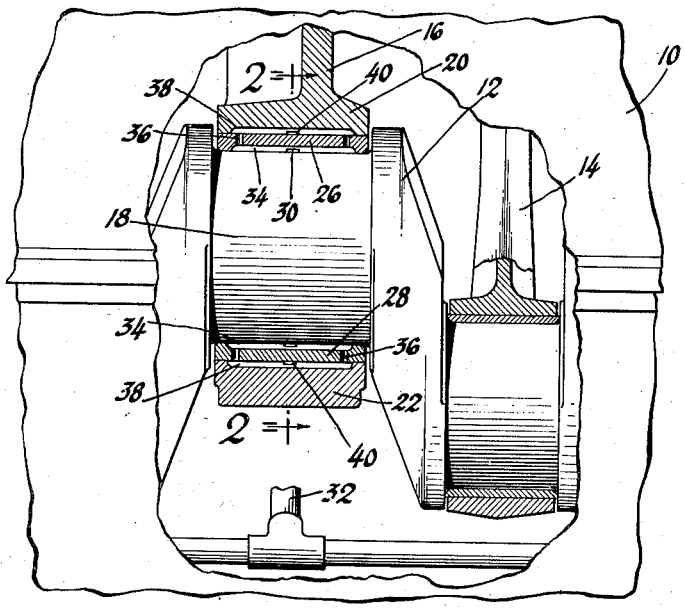
Fig. 1
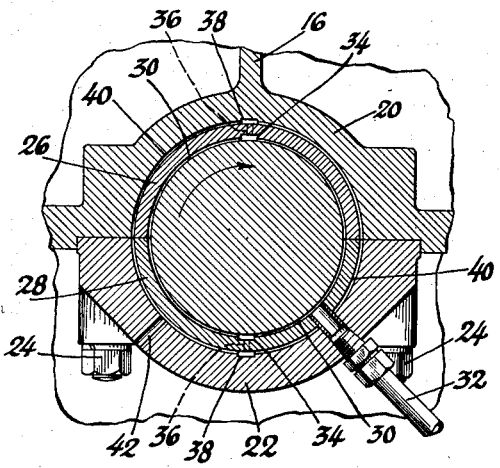
Fig. 2
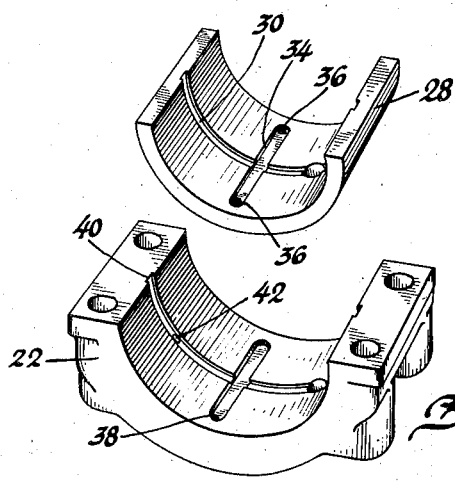
Fig. 3
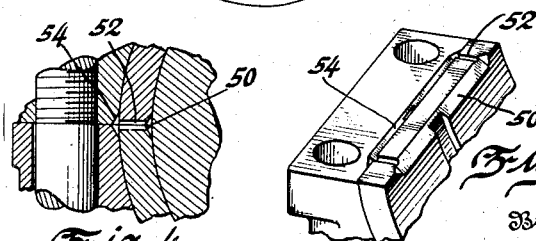
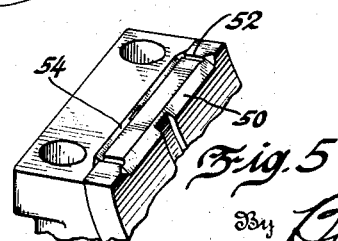
Fig. 4   Fig. 5
Inventor
Alex Taub
By Blackmore, Spencer & Flint
Attorneys Patented June 11, 1935

2,004,254

UNITED STATES PATENT OFFICE 2,004,254

CRANKSHAFT BEARING

Alex Taub, Detroit, Mich., assignor to General Motors Corporation, Detroit, Mich., a corporation of Delaware Application August 12, 1933, Serial No. 684,777

2 Claims. (Cl. 308—122)

This invention has to do with journal bearings of the type used in the main bearings of internal combustion engines, and particularly with means for lubricating them. Such bearings, as heretofore constructed, have commonly been provided with lubricant distributing channels extending in the direction of the axis of the shaft for spreading oil on the bearing surface to provide the desired film. These channels have been supplied with oil from a suitable source through apertures or grooves formed in the bearing but have not been provided with oil outlets at their outer ends, and as a consequence in the course of time the ends of the grooves have become filled with solid matter so that they no longer function to spread oil on the bearing surface. The result has been a gradual contraction of the area of the oil film, and consequently greater wear on the bearing surfaces.

According to my invention I provide for the circulation of oil through the grooves in the bearing, accomplishing this by the provision of oil outlets at the ends of the distributing channel. By thus circulating oil through the channels instead of providing simply a body of oil in static condition in them, there is no opportunity for sediment to collect so that the bearing surfaces are at all times assured of a good supply of clean lubricant. The improved oil film reduces wear, and so lengthens the life of the bearing.

In the drawing:

Figure 1 is a side view of a portion of an automobile engine showing part of the side of the crank case broken away to reveal one of the main bearings.

Figure 2 is a section on line 2—2 of Figure 1.

Figure 3 is an exploded view of the bearing and part of the bearing back.

Figure 4 is a fragmentary sectional view through a modified construction, while Figure 5 is a perspective view of a portion of one part of the bearing illustrated in Figure 4.

10 indicates the crankcase of an engine housing crankshaft 12 on which are journaled the connecting rods 14. 16 indicates a web of the engine block supporting the bearing for the journal 18 of the crankshaft. The bearing in which the part 18 is journaled consists of the bearing back comprising the portion 20 usually formed integral with the web 16 and the cap 22 held to the portion 20 by the usual bolts 24. The bearing likewise comprises the liner composed of upper section 26 and lower section 28. Both the upper and lower sections of the bearing are provided with the lubricant circulating system which is the subject of this invention.

As illustrated in Figures 2 and 3 the bearing liner is provided with circumferentially extending groove 30 to which oil is supplied through pipe 32 as shown. With the groove 30 communication the oil distributing channels 34 extend in the direction of the axis of the shaft. While these channels are shown as parallel to the shaft axis, they may extend at an angle thereto if desired, and may be curved rather than straight. The essential thing is that they extend in the direction of the axis so as to accomplish the spreading of oil on the bearing surfaces along the length of the bearing. It will be noted that channels 34 are provided at both the upper and lower halves of the bearing.

The construction so far described is conventional. My improvement consists in the provision of an outlet for the oil entering the distributing channels 34. While this may be accomplished in a number of different ways, I have found it best to provide oil discharge passages 36 at the ends of the channels 34. These passages discharge oil into parallel passages 38 formed in the top and bottom of the bearing back. The bearing back is likewise provided with circumferentially extending groove 40 from which lead discharge port 42 through which oil may drip into the crankcase or may, if desired, be returned to the oil pump.

With this construction it is apparent that oil from the usual pump enters the circumferential passage 30 and supplies the channels 34 with lubricant which is spread by the rotation of the shaft over the bearing surfaces. Some of the oil is discharged through the passages 36 into the channels 38, and thence into the circumferential passage 40 in the bearing back. From this passage the oil is discharged through port 42. In this manner a complete circulation of oil through the bearing is obtained.

In Figures 4 and 5, I have shown a slight modification in which the oil distributing channel 50 is formed at the parting line of the bearing. In this case, the passages 52 may be formed by grooving the parting line of the bearing liner, and the channel 54, as well as the channel 50, may be formed by beveling the corners of the liner and of the bearing back. This construction obviously has adantages in simplicity in machining.

I claim:

1. A journal bearing formed of sections fitted together, each of said sections comprising a bearing back and a liner, one of said backs and one of said liners being bevelled at the common parting line to provide parallel axially extending oil grooves, radial oil discharge grooves connecting said parallel grooves at the ends thereof, means for supplying oil to the groove in the liner and a passage for discharging oil from the groove in the bearing back.

2. A journal bearing comprising a bearing back and a bearing liner, said liner being provided on the inner face thereof with a circumferential oil groove and with an axial oil distributing groove communicating therewith, means for supplying oil to the circumferential groove, said liner and back being formed to provide a circumferential oil groove therebetween, an axial groove communicating therewith, passages connecting the said axial grooves, and an oil discharge port leading from said last-named circumferential oil groove.

ALEX TAUB.